United States Patent [19]

Yamamoto et al.

[11] 4,232,400
[45] Nov. 4, 1980

[54] ECHO CONTROL SYSTEM

[75] Inventors: Seiichi Yamamoto; Seishi Kitayama, both of Tokyo, Japan

[73] Assignee: Kokusai Denshin Denwa Kabushiki Kaisha, Tokyo, Japan

[21] Appl. No.: 37,176

[22] Filed: May 8, 1979

[30] Foreign Application Priority Data

May 16, 1978 [JP] Japan .................................. 53/57129

[51] Int. Cl.$^2$ .......................... H04B 1/16; H03B 1/00
[52] U.S. Cl. .................................... 455/305; 328/165; 358/167
[58] Field of Search ............... 325/473, 474, 475, 483; 328/162, 163, 165; 179/1 P, 15 AN, 15 AE; 340/1 R; 358/167, 905, 36

[56] References Cited

U.S. PATENT DOCUMENTS

| | | | |
|---|---|---|---|
| 4,008,439 | 2/1977 | Schroeder | 325/474 |
| 4,032,847 | 6/1977 | Unkauf | 325/473 |
| 4,152,657 | 5/1979 | Robers et al. | 325/473 |
| 4,166,251 | 8/1979 | Ishigaki et al. | 325/475 |

Primary Examiner—Robert L. Richardson
Assistant Examiner—Tommy P. Chin
Attorney, Agent, or Firm—Robert E. Burns; Emmanuel J. Lobato; Bruce L. Adams

[57] ABSTRACT

An echo control system for an adaptive echo canceller which cancels an echo signal while successively estimating the transmission characteristic of an echo path by the use of a received signal and the echo signal, comprising means using the received signal of a predetermined duration for obtaining an autoregression coefficient in a case of using the received signal as the output of an autoregressive model, means for obtaining a difference signal between a predicted value of the received signal produced by using the autoregression coefficient and the received signal, means for obtaining a difference signal between a predicted value of the echo signal produced by using the autoregression coefficient and the echo signal, a memory for storing the estimated transmission characteristic of the echo path, and a corrector for correcting the content of the memory following an identification method by learning. The content of the memory is successively corrected by the corrector on the basis of the difference signal of the received signal and the difference signal of the echo signal. An echo replica is produced using the successively corrected estimated transmission characteristic and is used to subtract it from the true echo signal, thereby cancelling the echo signal.

5 Claims, 7 Drawing Figures

ECHO CONTROL SYSTEM

FIELD OF INVENTION

This invention relates to an adaptive echo canceller which cancels an echo signal which successively estimating the transmission characteristic of an echo path by the use of a received signal and the echo signal.

BACKGROUND OF THE INVENTION

An echo is a long delay telephone circuit, such as a satellite communication circuit or the like, causes marked degradation of the speech quality. An echo suppressor now in use effectively suppresses an echo but has a defect such that degradation of the speech quality, such as speech interruptions, echos during overlapped talking, etc., is in principle unavoidable; therefore, an echo canceller gets much attention as a new echo suppressor. The principle of the echo canceller is to estimate the transmission characteristic of an echo path by the use of a received signal and an echo signal, to produce an echo replica on the basis of the estimation result and to subtract it from the true echo signal, thereby cancelling an echo.

The algorithm for the estimation of the transmission characteristic of the echo path in the conventional echo canceller is mainly based on a learning identification method; but, with this system, in a case of using a voice signal as the input signal, the convergence time is long so that the cancelled amount of an echo signal is insufficient due to high correlation in comparison with those in a case of using white noise as the input.

SUMMARY OF THE INVENTION

An object of this invention is to provide an echo control system in which the convergence time is shortened so that the cancelled amount of an echo signal is greatly increased in comparison with that in conventional systems.

In accordance with this invention, a received signal for each predetermined time interval is used to obtain an autoregression coefficient which is optimum in terms of a square error in a case of using the received signal as an output of an autoregressive model. A difference signal between a predicted value of the received signal obtained using the autoregression coefficient and the received signal is provided in addition to a difference signal between a predicted value of an echo signal obtained using the autoregression coefficient and the echo signal. The transmission characteristic of an echo path is successively estimated on the basis of the difference signals of the received signal and the echo signal. An echo replica is produced using the successively estimated transmission characteristic and is used to subtract it from the true echo signal, thereby to cancel the echo. With the echo control system of this invention, a suitable selection of the degree of the autoregressive model permits making the difference signal of the received signal white.

BRIEF DESCRIPTION OF DRAWING

This invention will be hereinafter described in details with reference to the accompanying drawing, in which.

DESCRIPTION OF PREFERRED EMBODIMENTS

Figure 1:
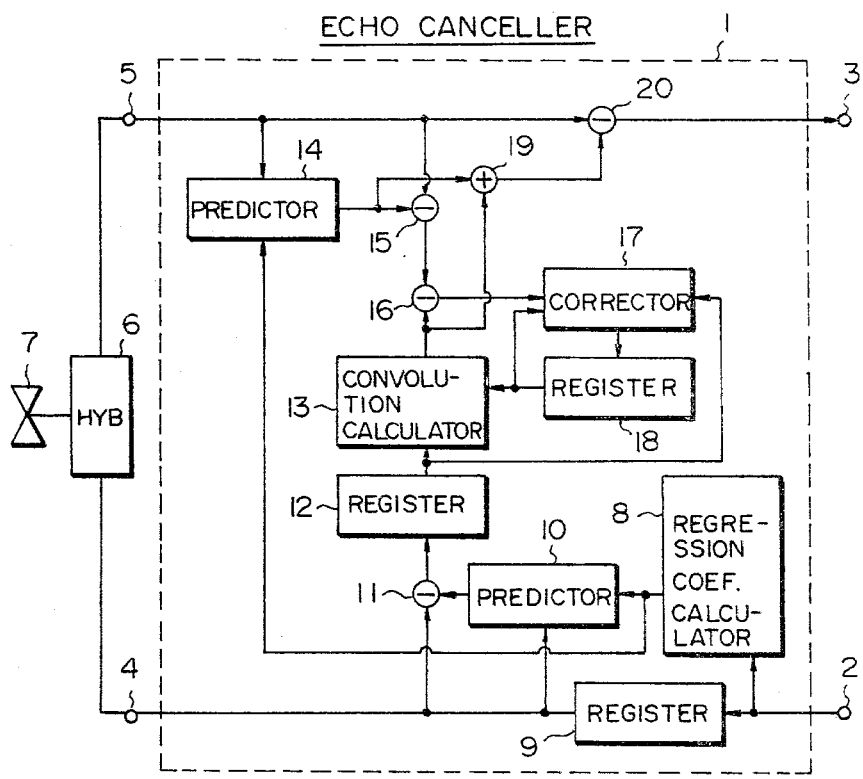
FIG. 1 is a block diagram showing an embodiment of an echo canceller of this invention.

For ready understanding this invention, the operation principle of this invention will first be described in comparison with a coventional method using a Kalman filter.

As an algorithm for successive estimation steps for the transmission characteristic of the echo path through the use of the received signal and the echo signal, there are the aforementioned learning identification method and a method employing a Kalman filter. In a case of using the Kalman filter, the following form is established. That is, a deviation of the echo path is regarded as a noise $W_j$ for convenience' sake and the status equation of the echo path is expressed as follows:

$$|h_{j+1}=|h_j+W_j$$

where $W_j$ is an N-dimensional vector. Similarly, on the assumption that a noise $v_j$ is additively superimposed on the residual signal of an echo signal observed at a time moment j, it is expressed as follows:

$$\bar{y}_j=\bar{x}_j^T\cdot|h_j+V_j$$

As it is said that steady noises in communication circuits are mostly normal white noises, let it be assumed, for the sake of brevity, that the noises $W_j$ and $v_j$ are normal white noises which are independent of each other and zero in mean value and have a constant variance. If a Kalman filter is used with the above $|h_j$ regarded as a status vector on the above assumption, the status vector $|h_j$ can successively be estimated and, by using the estimated value $\hat{h}_j$, the following echo replica can be generated:

$$y_j = \sum_{i=1}^{n} a_i y_{j-1} + \bar{x}_j^T \hat{h}_j$$

In this case, the estimated value $\hat{h}_j$, a variance-covariance matrix $p_j$ and a Kalman gain $k_j$ are expressed as follows:

$$h_{j+1} = \hat{h}_j + k_j(y_j - \hat{y}_j)$$
$$P_{j+1} = (1 - k_j\bar{x}_j^T)P_j + R_1 \quad R_1 = E[W_jW_j^T]$$
$$k_j = P_j\bar{x}_j/(\bar{x}_j^T P\bar{x}_j + x_2) \quad r_2 = E[V_j^2]$$

In a case of using the present invention, the residual signal $\bar{x}_j$ of the received signal is regarded as substantially white; therefore, it is also possible to use only the diagonal element of the variance-covariance matrix $p_j$ in the above equations. Incidentally, in a case of employing the Kalman filter, the amount of calculation is very large to introduce difficulty in the arrangement of hardware in the case of using the Kalman filter. Further, in a case of using only the diagonal element of the variance-covariance matrix of the Kalman filter, the amount of calculation is very small as compared with that in the case of using the Kalman filter itself but is about twice that in a case of the learning identification method.

The present invention adopts the learning identification method as an algorithm for estimation instead of using the Kalman filter having such defects as mentioned above.

With reference to the drawings, the present invention will hereinafter be described in detail but, for convenience of explanation, a difference signal between a true signal and an estimated value will hereinbelow be referred to as a residual signal.

FIG. 1 illustrates an embodiment of an echo canceller embodying this invention. Reference numeral 1 indicates an echo canceller; 2 designates an input terminal of the receiving side; 3 identifies an output terminal of the transmitting side; 4 denotes an output terminal of the receiving side; 5 represents an input terminal of the transmitting side; 6 shows a hybrid coil; 7 refers to a terminal equipment, such as a telephone set or the like; 8 indicates a regression coefficient calculator; 9 designates a register; 10 identifies a predictor; 11 denotes a subtractor; 12 represents a register; 13 shows a convolution calculator; 14 refers to a predictor; 15 and 16 indicate subtractors; 17 designates a corrector; 18 identifies a register; 19 denotes an adder; and 20 represents a subtractor. For the sake of brevity, it is assumed that a signal in the echo canceller 1 has the digital form and that though not shown in FIG. 1, clock pulses are supplied to respective parts.

The operation of the echo canceller will be described in the order of the reference numerals. A received signal from the input terminal 2 of the receiving side is applied to the terminal equipment 7 via the output terminal 4 of the receiving side and the hybrid coil 6; but a part of the received signal is supplied as an echo signal to the input terminal 5 of the transmitting side via the hybrid coil 6. In the echo canceller 1, a received signal $x_j$ is applied to the regression coefficient calculator 8 and, at the same time, to the predictor 10 after being delayed by the register 9 for a certain period of time. The regression coefficient calculator 8 provides regression coefficients $a_1, a_2, \ldots a_M$ using a received signal $x=(x_1, x_2, \ldots x_L)$ in a predetermined period of time. The algorithm employed therefore is based on, for example, the method of Durbin (Durbin, J. (1960). The fitting of time-series models, Rev. Inst. Stat., 28, 233-244). That is, if $$R_{|i-l|} = \frac{1}{L} \sum_{j=1}^{L} x_j x_j - |i - l|,$$

under the following initial conditions:

$$E^{(0)} = R_0 \quad (1)$$
$$a_1^{(0)} = R_1/E^{(0)} \quad (2)$$
$$E^{(1)} = E^{(0)}(1 - [a]^{(1)}]^2) \quad (3)$$

the regression coefficients are recurrently obtained as follows:

$$a_i^{(i)} = \frac{R_i - \sum_{j=1}^{i=1} a_j^{(i-1)} R_{i-j}}{E^{(i-1)}} \quad (4)$$

$$a_j^{(i)} = a_j^{(i-1)} - a_i^{(i)} a_{i-j}^{(i-1)} \quad (5)$$
$$j = 1, 2, \ldots, j - 1$$
$$E^{(i)} = E^{(i-1)}(1 - [a_1^{(i)}]^2) \quad (6)$$

$i = 2, 3, \ldots, M$

The regression coefficient calculator 8 may be lower in processing speed than the other parts and hence can be arranged mainly with a microprocessor. The regression coefficients $a_1, a_2, \ldots a_M$ respectively correspond to $a_1^{(M)}, a_2^{(M)}, \ldots a_M^{(M)}$ of the equations (4) and (5).

The regression coefficient $a = (a_1, a_2, \ldots a_M)$ obtained in the regression coefficient calculator 8 is transferred to the predictors 10 and 14. The predictor 10 produces $$\hat{x}_j = \sum_{i=1}^{M} a_i x_{j-1}$$

as the predicted value $\hat{x}_j$ of the received signal at the time moment j using the regression coefficient a and the received signal provided via the register 9.

Figure 2:
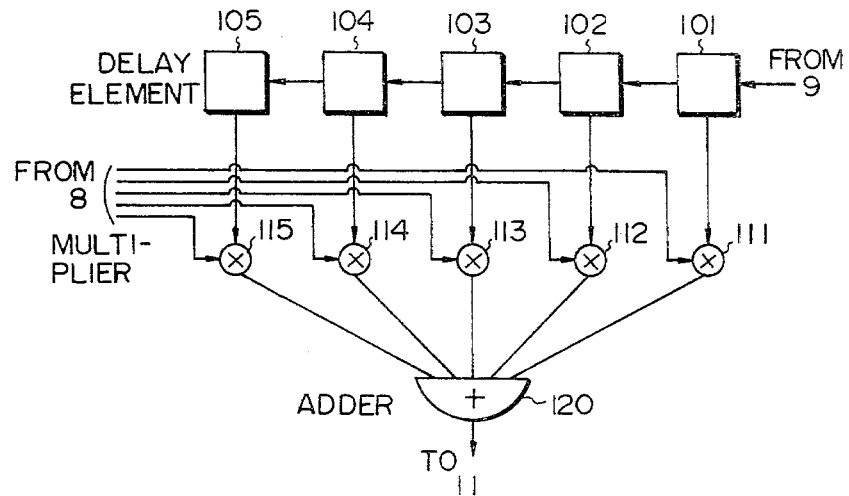
FIG. 2 is a diagram showing in detail an example of a predictor for use in this invention.

The predictor 10 is constructed as shown in FIG. 2, which shows a case of M=5. Reference numerals 101, 102, 103, 104 and 105 indicate delay elements; 111, 112, 113, 114 and 115 designate multipliers; and 120 identifies an adder.

The output $\hat{x}_j$ from the predictor 10 is transferred to the subtractor 11. On the basis of the received signal $x_j$ and the output $\hat{x}_j$ from the predictor 10, the subtractor 11 produces a residual signal $\tilde{x}_j = x_j - \hat{x}_j$, which is transferred to the register 12. The signal $\tilde{x}_j = (\tilde{x}_{j-1}, \tilde{x}_{j-2}, \ldots \tilde{x}_{j-N})$ in the register 12 and a signal $|h = (h_1, h_2, \ldots h_N)$ in the register 18 are applied to the convolution calculator 13 to effect a convolution calculation $$\sum_{i=1}^{N} h_i x_{j-i}$$

and the calculation result $$\hat{y}_j = \sum_{i=1}^{N} h_i x_{j-i}$$

is transferred to the subtractor 16.

The echo signal applied via the input terminal 5 of the transmitting side is applied to the predictor 14 and the subtractor 20. Using the regression coefficient a transferred from the regression coefficient calculator 8 and the echo signal $y_j$, the predictor 14 provides $$\hat{y}_j = \sum_{j=1}^{M} a_i y_{j-i}$$

as the predicted value $y_j$ of the received signal and applies the predicted value to the subtractor 15. In the subtractor 15, a residual signal $\tilde{y}_j = y_j - \hat{y}_j$ is produced by the echo signal $y_j$ and the output $\hat{y}_j$ from the predictor 14 and is transferred to the subtractor 16. In the subtractor 16, an error signal $\tilde{e}_j = \tilde{y}_j - \hat{y}_j$ is produced by the signal $\tilde{y}_j$ from the subtractor 15 and the signal $\hat{y}_j$ from the convolution calculator 13 and is transferred to the corrector 17. Using the error signal $\tilde{e}_j$ and the signal $\tilde{x}_j = (\tilde{x}_{j-1}, \tilde{x}_{j-2}, \ldots \tilde{x}_{j-N})$ in the register 12, the corrector 17 corrects the value $|h_j = (h_1, h_2, \ldots h_M)$ in accordance with the following algorithm of the learning identification method (refer to J. Nagumo and A. Noda: "A learning method for system identification", IEEE Trans., AC-12, 3, P. 282 (June 1976)):

$$|h_{j+1}| = |h_j| + \alpha \frac{\overline{e_j \tilde{x}_j}}{|\tilde{x}_j|^2} \quad (7)$$

In the equation (7), $|h_j|$ represents the value in the register 18 before correction and $|h_{j+1}|$ the value in the register 18 after correction. The notation $\alpha$ takes an arbitrary value, $0 < \alpha < 2$, but usually $\alpha = 1$.

The output $\hat{y}_j$ transferred from the predictor 14 to the adder 19 is added to the output $\hat{y}_j$ from the convolution calculator 13 and the added output, $y_j^p = \hat{y}_j + \hat{y}_j$, is transferred to the subtractor 20. In the subtractor 20, the output from the adder 19 is substracted from the echo signal $y_j$, and the resulting error, $e = y_j - y_j^p$, is sent out via the output terminal 3 of the transmitting side. In this case, when the signal in the register 18 becomes identical with the transmission characteristic of the echo path, the error e is reduced to zero and an echo signal to the talking party is cancelled.

In FIG. 1, if the regression coefficients a from the regression coefficient calculator 8 are all forced to be zero, the outputs from the predictors 10 and 14 become zero and the subtractors 11 and 15 provide the received signal $x_j$ and the echo signal $y_j$, respectively; this is identical in construction with the prior art echo canceller. Since the arrangements of the predictors 10 and 14 are already described, a detailed description will be given next of the regression coefficient calculator 8.

Figure 3A:
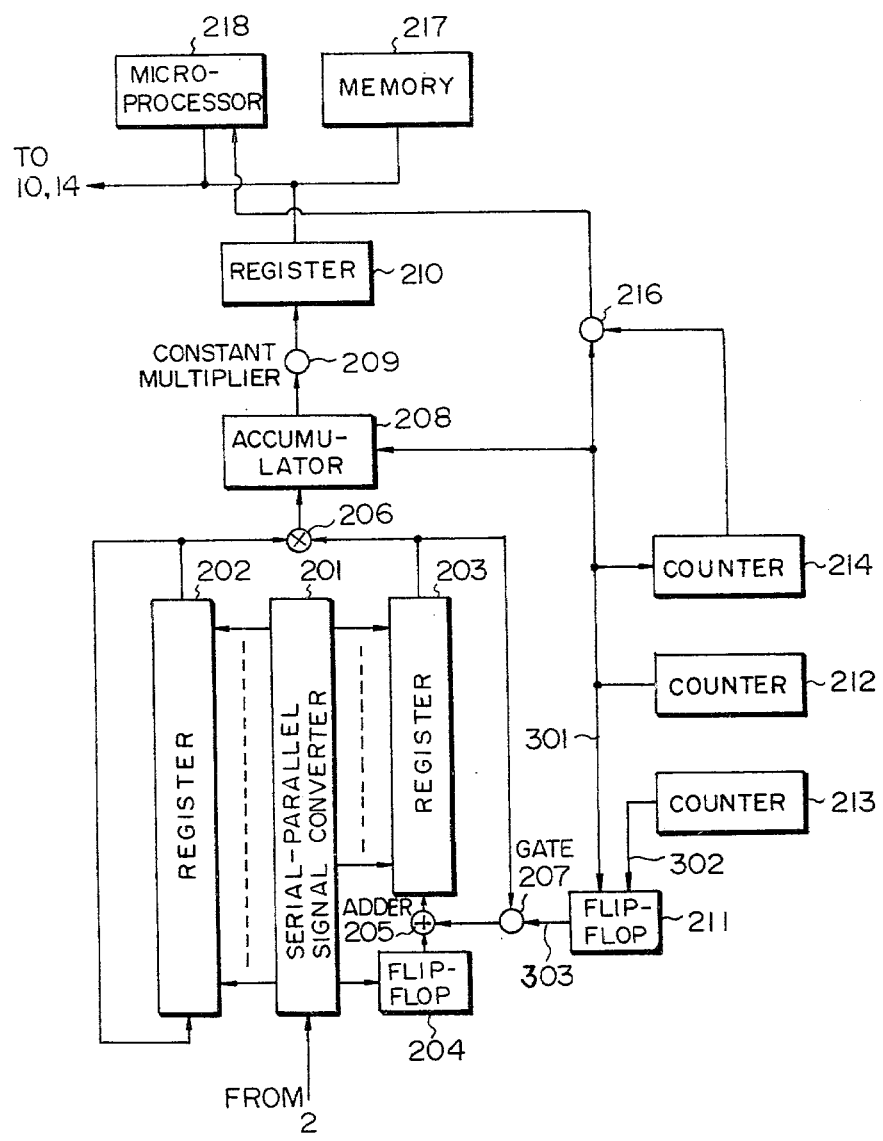
FIG. 3A is a diagram illustrating in detail a regression coefficient calculator for use in this invention.

FIG. 3(A) illustrates an example of the regression coefficient calculator 8. In FIG. 3A, reference numeral 201 indicates a serial-parallel signal converter; 202 and 203 designate registers; 204 identifies a flip-flop; 205 denotes an adder; 206 represents a multiplier; 207 shows a gate; 208 refers to an accumulator; 209 indicates a constant multiplier; 210 designates a register; 211 identifies a flip-flop; 212, 213 and 214 denote counters; 216 represents a gate; 217 shows a memory; and 218 refers to a microprocessor. The operation of the illustrated example will be given in the order of the reference numerals. The received signal $x_j$ supplied from the input terminal 2 of the receiving side is transferred to the serial-parallel signal converter 201 and when an L number of signals have been stored in the serial-parallel signal converter 201, the signals are transferred to the registers 202 and 203 and the flip-flop 204. The signals of the registers 202 and 203 and the flip-flop 204 circulate therein in synchronism with one another, by which a signal $x_j x_j$ is derived from the multiplier 206 and transferred to the accumulator 208. The accumulator 208 obtains an accumulated value $$\sum_{j=1}^{L} x_j x_j,$$

of the signal $x_j x_j$ from the multiplier 206. The counter 212 provides a signal for each L number of clock pulses to apply the content of the accumulator 208 to the constant multiplier 209. In the constant multiplier 209, the value, $$\sum_{i=1}^{L} x_j x_j,$$

from the accumulator 208 is multiplied by a constant (1/L) and the multiplied output is applied to the register 210. A pulse from the counter 212 is applied to the microprocessor 216 via its interrupt line to direct it to read the signal stored in the register 210. In response to this instruction, the microprocessor 216 stores the signal of the register 210 in the memory 217 at a specific address by an ordinary computer operation.

Figures 3B, 3C:
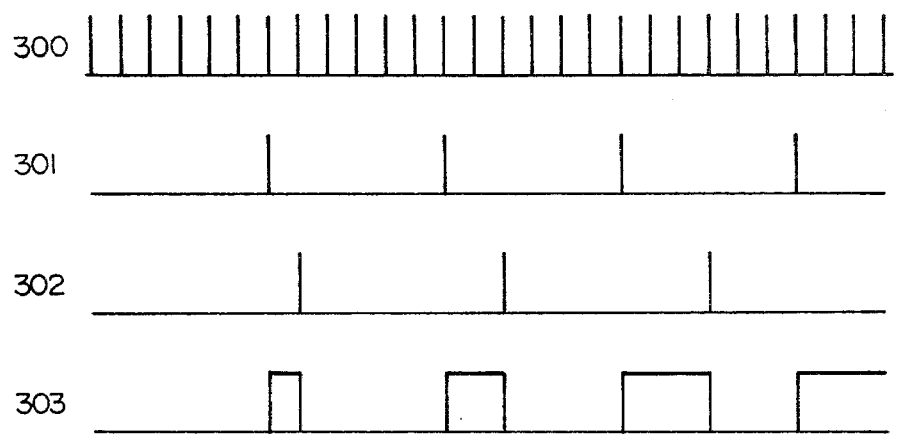
FIGS. 3B and 3C are diagrams explanatory of the operation of the predictor shown in FIG. 3(A)

On the other hand, the counter 213 generates a pulse for each (L+1) number of clock pulses, so that the flip-flop 211 assumes the state "1" during respective one, two, three, . . . clock pulses following the time of each of successive L-th clock pulses, as shown in FIG. 3B, and in this while the gate 207 is closed. In FIG. 3B, reference numeral 300 shows clock pulses, 301 the output pulses from the counter 212, 302 the output pulses from the counter 213, and 303 the state of the flip-flop 211. As a consequence, the signals in the register 203 are each displaced one by one relative to the signals in the register 202 for each L number of clock pulses, as shown in FIG. 3C. In FIG. 3C, reference numeral 400 indicates the signals in the register 202, while 401, 402 and 403 show the signals in the register 203 after occurrence of L, 2L and 3L number of clock pulses, respectively. As a result of this, signals, $$\frac{1}{L} \sum_{j=1}^{L} x_j x_{j+1}, \frac{1}{L} \sum_{j=1}^{L} x_j x_{j+2}, \ldots$$

are successively transferred to the register 210 as is the case with the foregoing. When having counted M pulses from the counter 212, the counter 214 closes the gate 216, so that M pulses in the register 210 are read out by the microprocessor 216 to the memory 217.

The microprocessor 216, using the data stored in the memory 217 from the register 210, produces $a_1^{(M)}$, $a_2^{(M)}, \ldots a_M^{(M)}$ in accordance with software formed to comply with the equations (1), (2), (3), (4), (5) and (6) and transfers them to the predictors 10 and 14.

It is also possible to provide a gate at the input side of the serial-parallel signal converter 201 by which only L of LN received signals are applied to the serial-parallel signal converter 201. In this instance, the regression coefficient a obtained from the L received signals is applied to the LN signals but, by the suitable determination of LN and L on the basis of the quasisteadiness of the received signal $x_j$, it is possible to obtain substantially the same effort as in a case of obtaining the regression coefficient a for all of the received signals.

Figure 4:
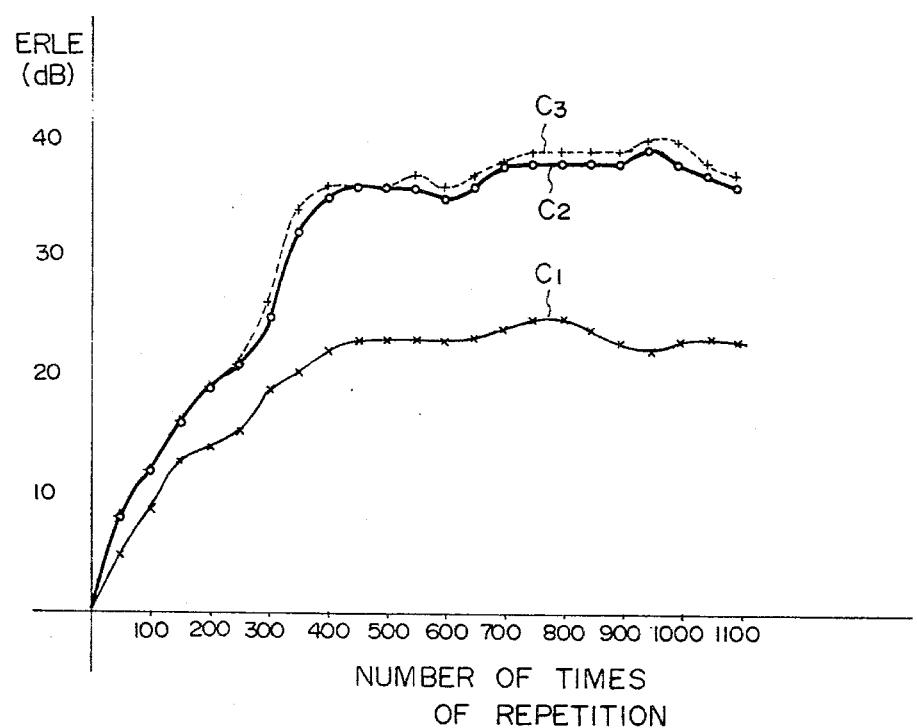
FIG. 4 is a characteristic diagram showing the results of simulation for the comparison of this invention in performance with a conventional system.

In a case of employing this invention, the convergence speed of the echo canceller is raised and the cancelled amount of an echo signal is also increased, as compared with those in the conventional system. FIG. 4 shows the results of simulation for the comparison of this invention with the conventional system. In FIG. 4, $C_1$ indicates a case of the conventional system, $C_2$ a case of the degree of the autoregressive model being 16 according to this invention and $C_3$ a case where the degree of the autoregressive model was set to M minimizing FPE, described later, for each receiption of a signal of a predetermined time length. The abovesaid conventional system indicates a case of using the learning identification method, that is, a case in which the regression coefficient a is made 0 so that the transmission characteristic of the echo path is estimated by using the received signal $\tilde{x}_j = (x_{j-1}, x_{j-2}, \ldots x_{j-N})$ and the echo signal $y_j$ in place of $\tilde{x}_j = (\tilde{x}_{j-1}, \tilde{x}_{j-2}, \ldots \tilde{x}_{j-N})$ and $\tilde{y}_j$. The abscissa in FIG. 4 represents the number of times of repetition and, in this case, since the sampling interval is 125 $\mu s$, 400 and 1000 repetitions correspond, respectively, to 500 milli-seconds and 100 milli-seconds. The ordinate represents the degree (ERLE) of improvment of echo return loss. ERLE indicates the degree of suppression of the error signal e relative to the echo signal y and the larger the value of ERLE is, the larger the cancelled amount of an echo signal is, which indicates excellent performance of the echo canceller. In FIG. 4, ERLE is larger than that in the conventional system in excess of 10 dB; therefore, the error signal is less than 1/10 that in the convention system.

Even if the degree of the autoregressive model of the received signal is fixed in advance, performance can be enhanced appreciably as compared with that of the prior art system but since the property of the received signal is not known in advance, it is desirable to obtain an optimum value by changing the degree of the model for each received signal of a constant duration. There have been known several methods for determining the degree of the model; but, from the practical point of view, such as the amount of calculation steps, etc., such a system is excellent in which the value minimizing the final predicted error (FPE) is the degree of the model. Further, the simulation results of FIG. 4 show that the system employed FPE is larger in the cancelled amount of an echo signal and high in convergence speed. What is meant by FPE(M) is the value given by $$FPE(M) = \frac{1 + N^{-1}(M + 1)}{1 - N^{-1}(M + 1)} \times E^{(M)}$$

where $E^{(M)}$ is the same as the equation (6). (Refer to Akaike: "Fitting autoregressive models for prediction", Ann. Inst. Statist. Math., 21, 243–247).

Figure 5:
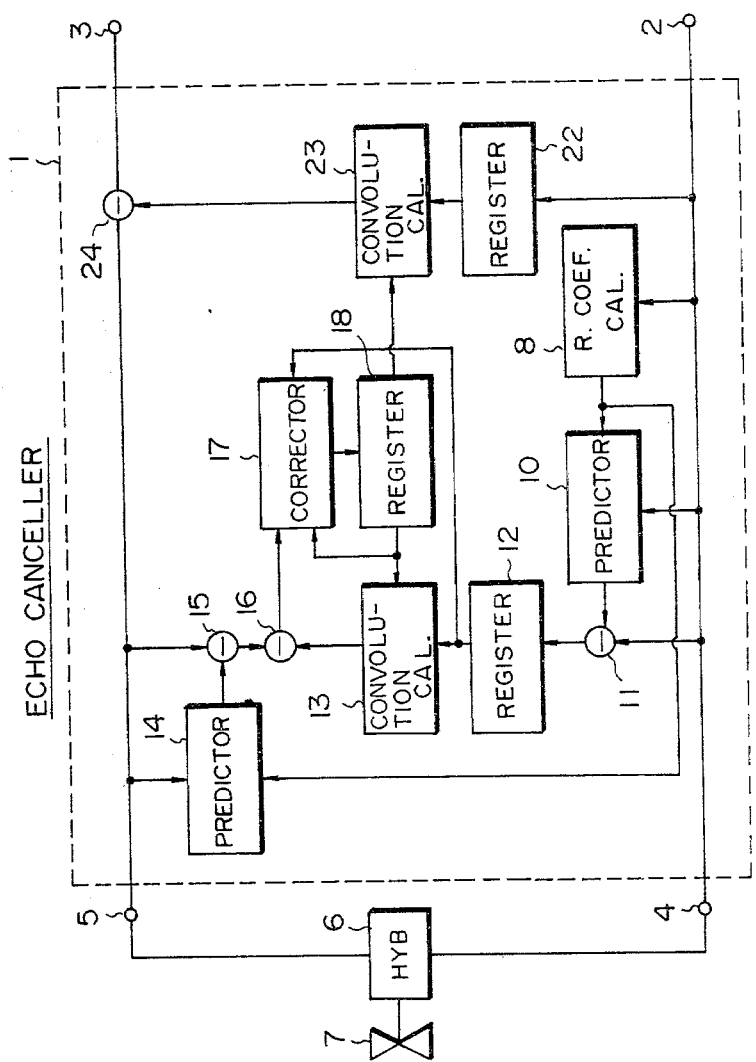
FIG. 5 is a block diagram illustrating another embodiment of this invention.

With reference to FIG. 5 showing another embodiment of this invention, the same parts as those in the embodiment shown in FIG. 1 are indicated by the same reference numerals. In this embodiment, a register 22, a convolution calculator 23 and a subtractor 24 are employed, while the register 9, the adder 19 and the subtractor 20 are removed from the embodiment shown in FIG. 1.

In the embodiment shown in FIG. 5, the contents of the register 18 are similarly corrected as the operation of the embodiment shown in FIG. 1.

The received signals are successively stored in the register 22, while the signals stored in the register 22 are convolution-calculated in the convolution calculator 23 with the stored signals of the register 18, so that an echo replica is applied from the convolution calculator 23 to the substractor 24. Other operations are similarly carried out as those in the embodiment shown in FIG. 1.

The embodiment shown in FIG. 5 has the following merits in comparison with the embodiment shown in FIG. 1:

(1) A signal delay in the register 9 inserted in the main path between the terminals 2 and 4 can be eliminated.

(2) If the echo canceller 1 is fault, the signal can be transferred through the main path of the receiving side.

As has been described in the foregoing, the present invention greatly enhances the performance of the echo canceller, such as the cancelled amount of an echo signal and the convergence speed, only by a little increase in the amounts of calculation steps and in the hardware used and also enables the removal of a center clipper and like accessories employed in conventional echo cancellers.

Although the foregoing embodiment has been described in connection with a case of employing the successive learning identification method as the algorithm for the estimation of the transmission characteristic of an echo path, the present invention is also applicable to a case of using an algorithm following an identification method by learning except a case of employing a Kalman filter, as described previously.

What we claim is:

1. In an echo control system for an adaptive echo canceller which cancels an echo signal while successively estimating the transmission characteristic of an echo path by the use of a received signal to a receiving path and the echo signal passing the echo path from the receiving path and a transmission path, the improvement comprising:

first means connected to the receiving path for developing from the received signal for each of successive predetermined durations an autoregression coefficient in a case of using the received signal as the output of an autoregressive model, second means connected to the receiving path and the first means for developing a first difference signal between the received signal and a predicted value of the received signal obtained by the use of the autoregression coefficient, third means connected to the first means and the transmission path for developing a second difference signal between the echo signal and a predicted value of the echo signal produced by the use of the autoregression coefficient, fourth means operatively connected to the second means and the third means for storing the estimated transmission characteristic of the echo path, fifth means operatively connected to the second means, the third means and the fourth means for successively correcting the contents of the fourth means in accordance with an identification method by learning by the use of the first difference signal and the second difference signal, sixth means connected to the fourth means for developing an echo replica, and seventh means inserted in the transmission path and connected to the sixth means for subtracting the echo replica from the echo signal to substantially cancel the echo signal.

2. An echo control system according to claim 1, wherein the degree of the autoregressive model is changed within a predetermined range of values in accordance with the property of the received signal.

3. An echo control system according to claim 1, wherein the degree of the autoregressive model is selected to be a value minimizing a final predicted error within a predetermined range of values.

4. An echo canceller according to claim 1, wherein said sixth means is connected to the third means for developing the echo replica by the use of the predicted value of the echo signal.

5. An echo canceller according to claim 1, wherein said sixth means is connected to the receiving path for developing the echo replica by the use of the received signal.

* * * * *